No. 688,096. Patented Dec. 3, 1901.
W. O. JOURNEAY.
COMBINED CONCENTRATOR, AMALGAMATOR, AND SEPARATOR.
(Application filed Apr. 11, 1901.)
(No Model.) 2 Sheets—Sheet 2.
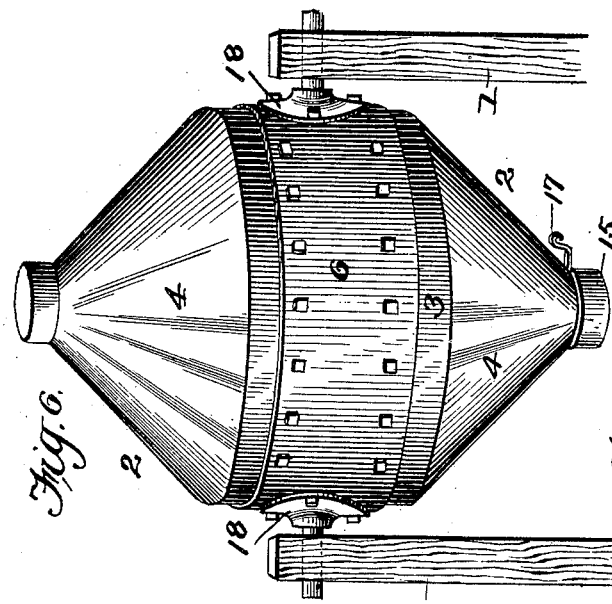
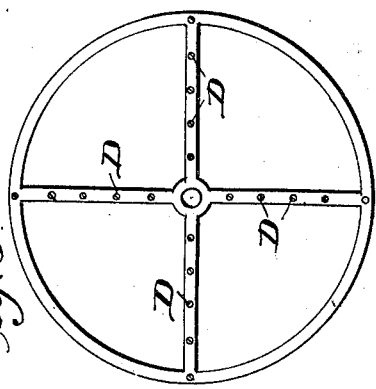
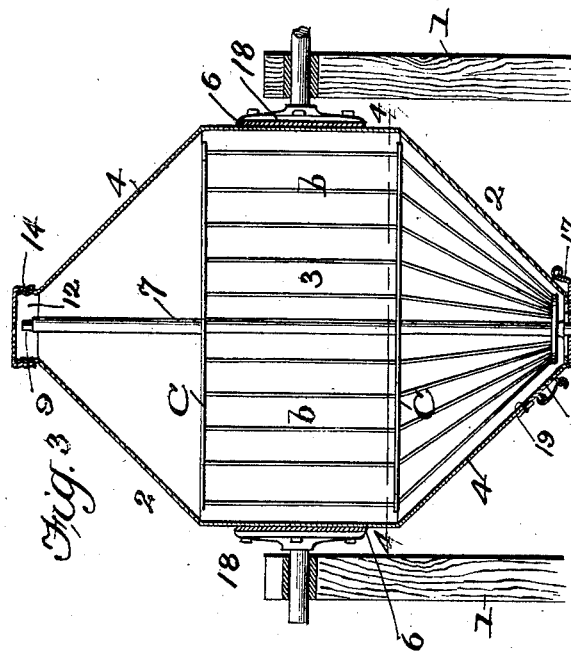
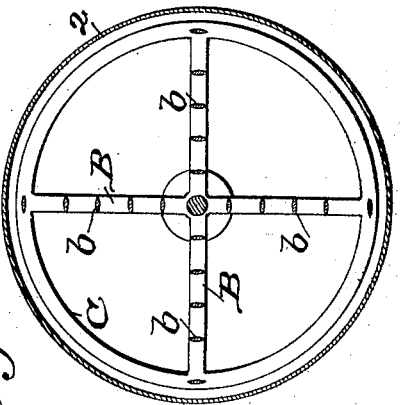
WITNESSES:
Jos. A. Ryan
Edw. W. Byrn.
INVENTOR
William O. Journeay
BY Munn & Co.
ATTORNEYS

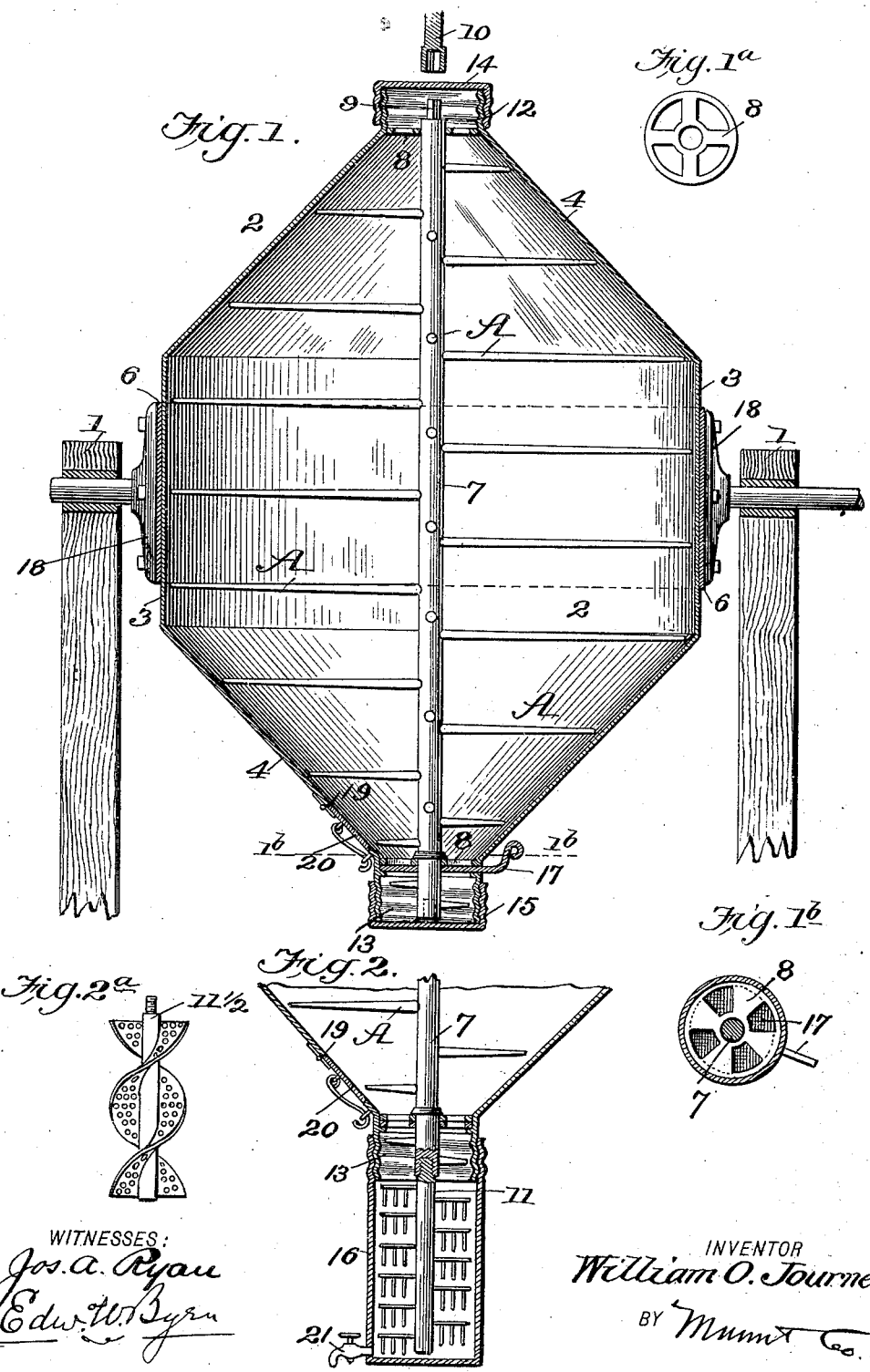

UNITED STATES PATENT OFFICE.

WILLIAM O. JOURNEAY, OF AUSTIN, TEXAS.

COMBINED CONCENTRATOR, AMALGAMATOR, AND SEPARATOR.

SPECIFICATION forming part of Letters Patent No. 688,096, dated December 3, 1901.

Application filed April 11, 1901. Serial No. 55,327. (No model.)

*To all whom it may concern:*

Be it known that I, WILLIAM O. JOURNEAY, of Austin, in the county of Travis and State of Texas, have invented a new and useful Improvement in a Combined Concentrator, Amalgamator, and Separator, of which the following is a specification.

The invention relates to a combined concentrator, amalgamator, and separator.

It has for its object to provide a simple, economical, and efficient machine suitable for treating ore or gravel, and whether dry, with water, with mercury, or with both.

It relates to that form of device in which a chamber receives its ore at the top and discharges it at the bottom and is provided with a vertical rotary shaft with stirrer; and it consists in the peculiar construction and arrangement of the parts as will be hereinafter described with reference to the drawings, in which—

Figure 1 is a vertical longitudinal section. Fig. 1$^a$ is a detail of spider-frame bearing 8, and Fig. 1$^b$ a section on line 1$^b$ 1$^b$. Fig. 2 shows an attachment to the lower end of the chamber. Fig. 2$^a$ is a modification of the extension-shaft. Fig. 3 is a sectional view of a modification, and Fig. 4 a cross-section of the same on line 4 4. Fig. 5 is a similar view of a modification of the stirrer, and Fig. 6 is an external view of the device.

Numeral 1 denotes the posts of a frame which may be of any desired form and character.

2 is an iron receptacle, preferably of a form similar to that shown in the illustration, and comprising a central cylindrical body portion 3 and frusto-conical ends 4. This receptacle, together with coöperating parts, may be used as a concentrator, an amalgamator, a separator, or as a washer. It is provided with journals supported in the frame and can be rotated by the kind of power desired.

6 denotes a band to furnish a suitable attachment for the journals to strengthen the receptacle, and the machine can be taken apart by unbolting the band.

7 denotes a vertical shaft having journals bearing in cross pieces or spiders 8, fixed in the open ends of the parts 4 of the receptacle 2.

9 denotes the end of shaft 7, shaped to receive a detachable handle 10 or other means of rotating the shaft. The opposite end of shaft 7 has a screw-threaded socket to receive a detachable shaft extension 11 or 11$\frac{1}{2}$. The shaft 7 has detachable radially-projecting stirring-fingers A. As a modification of the stirring-fingers A a cage, (see Figs. 3 and 4,) composed of two rings C C, radial arms B B, and vertical blades $b$ may be used, the blades running with a convergence down in the taper of the cone. Wires or rods D may take the place of these blades, as seen in Fig. 5. The extension-shaft 11 has horizontal stirring-finger rakes. A modification of this is seen in Fig. 2$^a$, in which the extension-shaft 11 11$\frac{1}{2}$ has spiral perforated plates.

12 and 13 indicate screw-threaded nozzles or charging and discharging tubes fixed in the receptacle ends 4, and 14 and 15 are screw-caps for closing the tubes or openings at will.

16 is a detachable close-bottomed supplemental case adapted to be substituted for cap 15 and used to inclose the shaft extension 11 or 11$\frac{1}{2}$ to act as a separator. It has an outlet-faucet 21 to permit the drawing off of quicksilver or water, which can be run through the charge any number of times or saved for the next charge.

17 is a rotary damper cut-off in the lower end of the machine for opening and closing without the use of cap 15; but cap 15 must be used when amalgamating.

18 is the flange holding band 6 and the trunnion-shaft together.

19 is an opening in the lower part of the chamber 2 and is provided with a hinged water-tight door 20, with spring latching device, to draw off tailings without disconnecting chamber 16, thus making the process continuous.

In operation the concentrating, amalgamating, or washing receptacle 2 is suitably turned and the material is charged into the tube or nozzle 12, and mercury, also, if it is to be used, the opposite tube 13 being closed at such times by its screw-cap and cut-off 17. The charging-opening is then closed, and the receptacle is rotated by its crank or other suitable means and the material thoroughly stirred and mixed, the fingers A, bars $b$, or rods D coöperating in this action. After the material has been sufficiently mixed the receptacle is suitably turned to prevent spilling and cap 15 is removed. The shaft extension 11 or 11½ is then attached to shaft 7 and the supplemental case or separator 16 screwed onto tube 13. The receptacle is again turned and cut-off 17 opened to permit the metals to settle in the separator. The shaft is then rotated to accelerate this operation, and by its continued rotation the separation is completed within the separator by the coöperation of the shaft extension. If any refuse is entangled with the metals and carried into the separator, it will be freed therein by the fingers, rakes, or perforated plates and floated up by the heavier elements.

The particular means of constructing, supporting, and operating the machine and other details may be varied as found convenient or desirable, provided no changes are made inconsistent with the improvements hereinafter pointed out.

The machine can be constructed of any material desired.

Having thus described my invention, what I claim as new, and desire to secure by Letters Patent, is—

1. The double conical receptacle provided with oppositely-situated charging and discharging openings at the apices of the cones, caps for covering and uncovering the openings, and a stirring-shaft situated between said openings with its longitudinal axis in line with the openings and its ends extended into and inclosed by the caps, substantially as described.

2. The receptacle provided with oppositely-situated charging and discharging openings, caps for covering and uncovering the openings, a stirring-shaft situated between said openings with its longitudinal axis in line with the same and its ends inclosed by the caps, one end being formed to receive a detachable device for rotating the shaft, substantially as described.

3. The receptacle provided with oppositely-situated charging and discharging openings, caps for covering and uncovering the openings, a stirring-shaft situated between said openings with its longitudinal axis in line with the same and inclosed by the caps and trunnion for the receptacle having an axis at right angles to the stirring-shaft, substantially as described.

4. The receptacle provided with oppositely-situated charging and discharging openings, caps for covering and uncovering the openings, and a stirring-shaft situated between said openings with its longitudinal axis in line with the same and its ends inclosed by the caps, said receptacle being rotatably supported on an axis transverse to the stirring-shaft, substantially as described.

5. The receptacle provided with oppositely-situated charging and discharging openings, caps for covering and uncovering the openings, a stirring-shaft situated between said openings, and a supplemental separator-case adapted to be substituted for the lower cap, substantially as described.

6. The receptacle provided with oppositely-situated charging and discharging openings, caps for covering and uncovering the openings, a stirring-shaft situated between said openings, a supplemental separator-case adapted to be substituted for the lower cap and a detachable shaft extension adapted to be connected to the stirring-shaft and situated in said supplemental separator-case, substantially as described.

7. The receptacle having a cylindrical body and frusto-conical ends, each end having an opening, removable caps to close the openings, a damper cut-off for the lower opening, a band surrounding the body, journals fixed to the band, means for turning the receptacle on its journals, a stirring-shaft having journals arranged in bearings in cross-bars adjacent the openings, and means for rotating the stirring-shaft, substantially as described.

8. The receptacle having a cylindrical body and frusto-conical ends, each end having an opening, removable caps to close the openings, a band surrounding the body, journals fixed to the band, means for turning the receptacle on its journals, a stirring-shaft with detachable fingers, or their described equivalents, spider-journals in each end of receptacle supporting stirring-shaft, a damper cut-off in lower end of receptacle, an extension-shaft with stirring devices, and a detachable cylindrical, separator adapted to be secured to lower end of the receptacle, substantially as described.

In testimony whereof I have signed my name to this specification in the presence of two subscribing witnesses.

WILLIAM O. JOURNEAY.

Witnesses:
 IRA HARTSOOK,
 H. M. LITTLE.